United States Patent
Cen

(10) Patent No.: US 8,418,720 B2
(45) Date of Patent: *Apr. 16, 2013

(54) WATER DIVERTING DEVICE

(75) Inventor: Difeng Cen, Ningbo (CN)

(73) Assignee: Ningbo Bosheng Plumbing Co., Ltd., Ningbo, Zhejiang Province (CN)

( * ) Notice: Subject to any disclaimer, the term of this patent is extended or adjusted under 35 U.S.C. 154(b) by 989 days.

This patent is subject to a terminal disclaimer.

(21) Appl. No.: 12/219,362

(22) Filed: Jul. 21, 2008

(65) Prior Publication Data

US 2009/0025813 A1 Jan. 29, 2009

(30) Foreign Application Priority Data

Jul. 26, 2007 (CN) .......................... 2007 1 0070337

(51) Int. Cl.
*F16K 11/07* (2006.01)
*F16K 1/02* (2006.01)
*F16K 11/14* (2006.01)
*F16K 1/00* (2006.01)
*F16K 17/04* (2006.01)
*F16K 31/44* (2006.01)
*F16K 15/00* (2006.01)

(52) U.S. Cl.
USPC ...... 137/625.48; 137/862; 137/872; 137/878; 251/230; 251/227; 251/319; 251/318

(58) Field of Classification Search ................. 137/861, 137/862, 119.05, 872, 877, 878, 467, 118.07, 137/625.48, 119.01, 119.03, 454.2; 251/227, 251/230, 318, 319

See application file for complete search history.

(56) References Cited

U.S. PATENT DOCUMENTS

| 1,095,295 | A | * | 5/1914 | Stevens | 251/230 |
| 2,219,105 | A | * | 10/1940 | Klein | 137/456 |
| 2,277,837 | A | * | 3/1942 | Auld et al. | 137/122 |
| 2,592,361 | A | * | 4/1952 | Weber | 74/503 |
| 3,697,713 | A | * | 10/1972 | Ohkita | 200/524 |
| 4,956,529 | A | * | 9/1990 | Ueno | 200/524 |
| 4,982,762 | A | * | 1/1991 | Lee et al. | 137/614.17 |
| 5,094,200 | A | * | 3/1992 | Fontichiaro | 123/188.3 |
| 5,608,928 | A | * | 3/1997 | Wang | 4/678 |
| 5,670,762 | A | * | 9/1997 | Futamura | 200/16 D |
| 2010/0171053 | A1 | * | 7/2010 | Williamson et al. | 251/58 |

FOREIGN PATENT DOCUMENTS

DE 3545621 A1 * 6/1986
GB 2206237 A * 12/1988
SU 414438 * 6/1974

* cited by examiner

*Primary Examiner* — John K Fristoe, Jr.
*Assistant Examiner* — Hailey K Do
(74) *Attorney, Agent, or Firm* — Jacobson Holman PLLC; Jiwen Chen

(57) ABSTRACT

A water diverting device comprises an inlet, two outlets, an upper and a lower sealing seats respectively for the outlets. The device further comprises a water diverting switch that fits with the sealing seats and used to switch over the outlets. The switch includes a sliding shaft and fixed base with a sliding through hole. The switch is provided with a retaining hook for holding the sliding shaft up and down direction. On the surface of the sliding shaft, there are the first and second stop positions for the hook part of the hook, first and second unidirectional slide channels. The switch has a spring pushing the shaft from its head towards its tail. The head of the shaft connects with a valve core, and positions of the sealing seats correspond with travel of the valve core. The water discharge direction is changed over by a diverting switch.

6 Claims, 6 Drawing Sheets

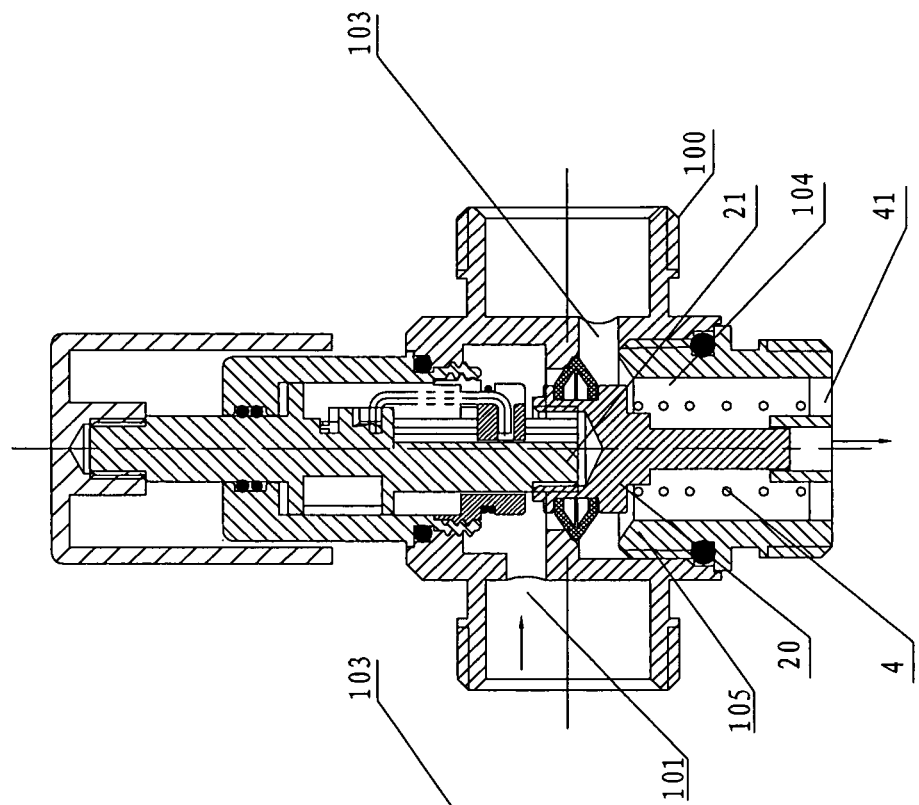
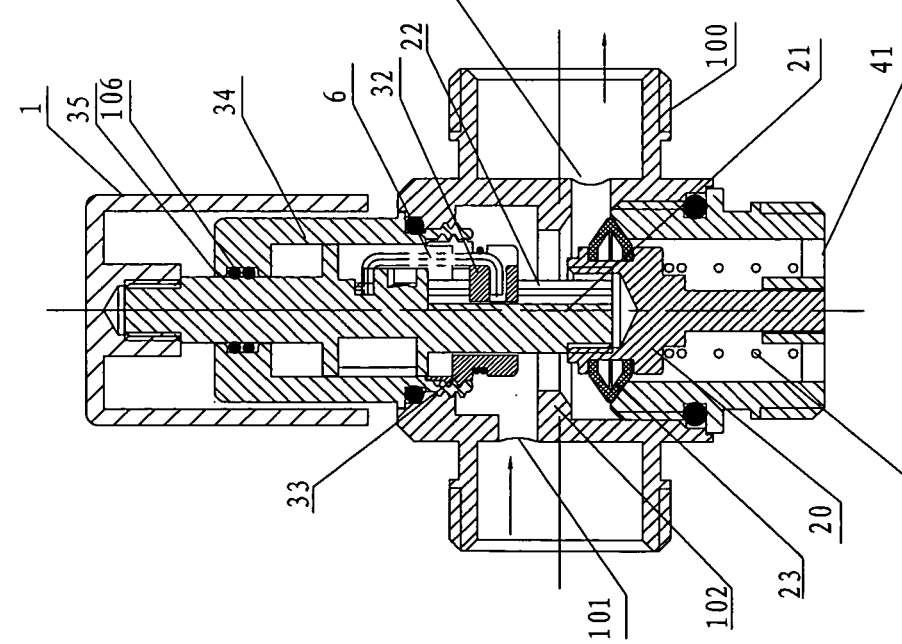

ated with a valve core, and the positions of the upper sealing seat and the lower sealing seat corresponding with a movement distance of the valve core.

WATER DIVERTING DEVICE

TECHNICAL FIELD

The present invention relates to a water diverting device.

BACKGROUND TECHNOLOGY

Current water separating devices, such as a diverting device for a water faucet or divider, all use the traditional pushing/pulling method to change water discharge direction. Their most significant shortcoming is difficult operation, poor sealing and short service life. Their operation is also affected by water pressure, and if water is not discharged at a specified pressure, the water diverter will move downward under its weight and water will not be discharged at the lower position.

SUMMARY OF INVENTION

A technical problem solved by the present invention is to provide a water diverting device that is easy to operate and has a long service life.

In a first aspect, the present invention provides the following technical design:

A water diverting device comprises a water inlet and two outlets, an upper sealing seat and a lower sealing seat, and a water diverting switch that fits with the upper sealing seat and the lower sealing seat, whereby the water diverting switch is used to switch over between the two outlets. The water diverting switch includes a sliding shaft and a fixed base, whereby the fixed base comprises a sliding through hole for passing the sliding shaft, and a retaining hook having a hook part. On the sliding shaft, there are a first stop position and a second stop position, each respectively shaped to fit with the hook part of the retaining hook, and the first stop position and the second stop position are each located at different heights on the sliding shaft, with the first stop position being closer to a head of the sliding shaft than the second stop position. On the sliding shaft, there is further a first unidirectional slide channel for the hook part of the retaining hook. The first unidirectional slide channel allows the sliding shaft move from a state where the first stop position is fitting with the hook part of the retaining hook to a state where the second stop position is fitting with the hook part of the retaining hook. A second unidirectional slide channel for the hook part of the retaining hook, the second unidirectional slide channel allows the sliding shaft move from a state where the second stop position is fitting with the hook part of the retaining hook to a state where the first stop position is fitting with the hook part of the retaining hook. The first unidirectional slide channel comprises a first slide way section starting at the first stop position and a second slide way section connected with the first slide way section and leading to the second stop position, the connection from the second slide way section with the first slide way section being located farther away from the head of the sliding shaft than the second stop position. The second unidirectional slide channel comprises a third slide way section starting at the second stop position and a fourth slide way section connected with the third slide way section, the connection from the fourth slide way section with the third slide way section being located farther away from the head of the sliding shaft than the second stop position, and the fourth slide way section is connected with the first slide way section or connected to the first stop position. The water diverting switch further comprises a spring pushing the sliding shaft along a direction from the head of the sliding shaft towards a tail of the sliding shaft, the head of the sliding shaft being connected with a valve core, and the positions of the upper sealing seat and the lower sealing seat corresponding with a movement distance of the valve core.

During operation, the object of the present invention is achieved by the moving and static arrangement of the fixed base and the sliding shaft, and the fit between the sealing seats and the valve core. The water dispensing direction can be changed by only pressing a diverting switch. Thus, the present invention is easy to operate and better complies with a user's ergonomic habit of applying a force, with good sealing effect, excellent durability and long service life. In addition, the present invention has high operation reliability and its water diverting function is implemented without being affected by water pressure.

In a preferred embodiment of the present invention, the first slide way section and the second slide way section are connected in the form of a step, and at the connection between the first slide way section and the second slide way section, a channel bottom surface of the second slide way section is lower than a channel bottom surface of the first slide way section; the third slide way section and fourth slide way section are connected in the form of a step, and at the connection between the third slide way section and the fourth slide way section, a channel bottom surface of the fourth slide way section is lower than a channel bottom surface of the third slide way section. The second slide way section has a down step near the second stop position. The fourth slide way section and the first slide way section are connected in the form of a step, and at the connection between the fourth slide way section and the first slide way section, the channel bottom surface of the first slide way section being lower than the channel bottom of the fourth slide way section.

In a further preferred embodiment, the water diverting device further comprises a circumferential positioning mechanism for the sliding shaft.

In a further preferred embodiment, the sliding shaft has a positioning slot in the axial direction, and the fixed base is provided with a positioning block part fitting with the positioning slot.

In a further preferred embodiment the retaining hook is connected by hooking to the fixed base, and on an outer side of the fixed base there is a ring spring for fixing the retaining hook.

In a further preferred embodiment the retaining hook is connected by hooking to the positioning block part of the fixed base, and on an outer side of the fixed base there is a ring spring for fixing the retaining hook.

In a further preferred embodiment the fixed base includes a mounting piece and a connection sleeve connected with the rear part of the mounting piece. The sliding shaft is smaller near its tail or between its middle and tail and goes through the connection sleeve. The connection sleeve has a small hole that fits with the smaller part of the sliding shaft.

In a further preferred embodiment the retaining hook is connected by hooking to the mounting piece and there is a ring spring for fixing the retaining hook on an outer side of the mounting piece.

In a further preferred embodiment the tail of the sliding shaft is connected with a button, and the spring is located between the fixed base and the button.

In a further preferred embodiment there is a spring bracket on an external side of the lower sealing seat and the spring is between the spring bracket and valve core.

BRIEF DESCRIPTION OF DRAWINGS

FIG. 7 is the sectional view of the present invention when it is applied for a water diverter and is in an upper water dispensing position.

FIG. 8 is the sectional view of the present invention when it is applied for a water diverter and is in a lower water dispensing position.

PREFERRED EMBODIMENTS

Embodiment 1

Figure 1:
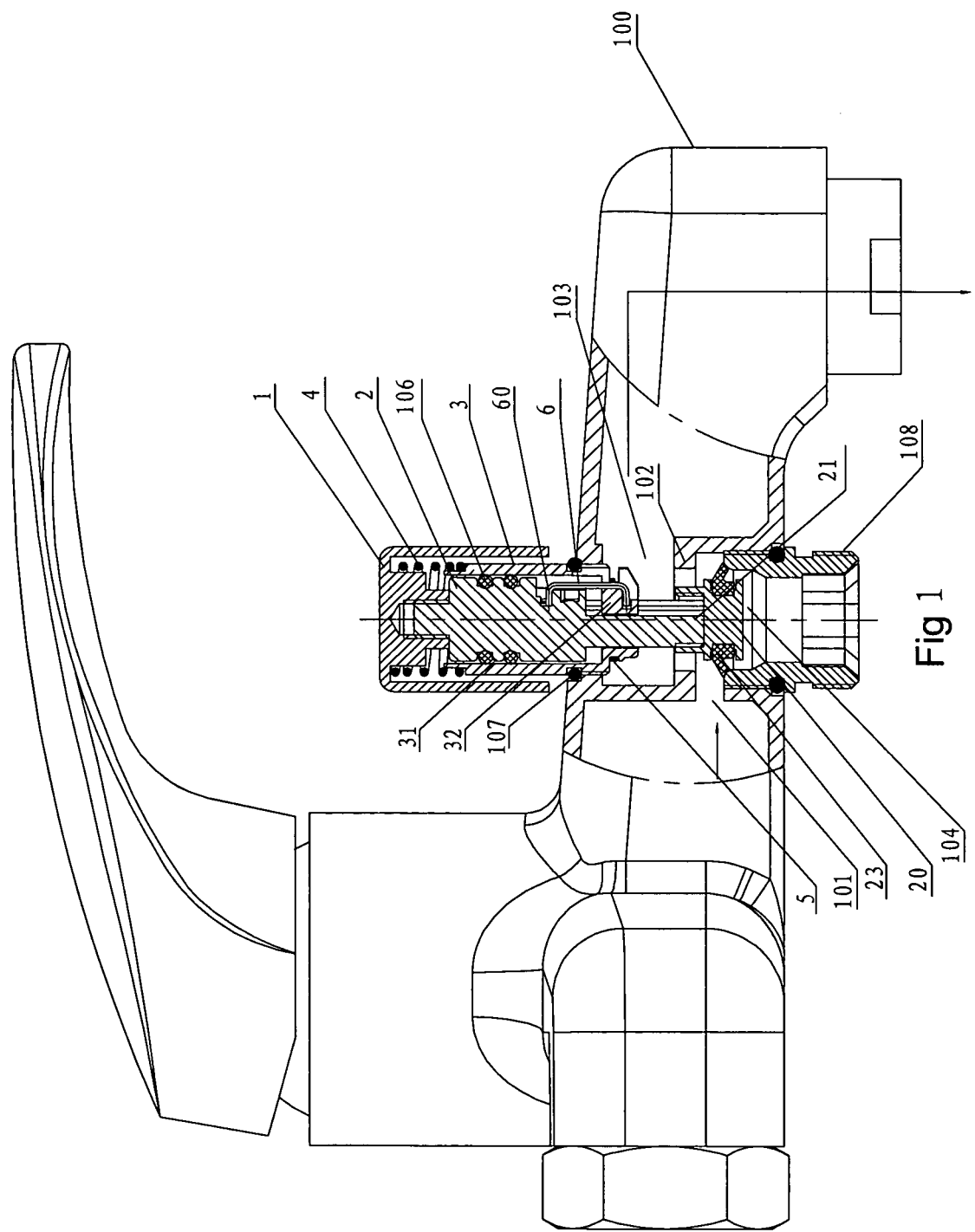
FIG. 1 is a sectional view of one embodiment of the present invention when it is applied for a faucet and is in an upper water dispensing position.

Referring to FIG. 1, FIG. 2, FIG. 3 and FIG. 4, this embodiment is the embodiment of the present invention that is used for a faucet 100. The present invention includes water inlet piping inlet 101 and two water outlet piping outlets 103 and 104, that are comprised in a water diverting device. The two water outlet piping outlets of the water diverting device are provided with, respectively, upper sealing seat 102 and lower sealing seat 105 (see FIG. 2 in particular for this reference). The water diverting device is fitted with a water diverting switch that fits with the sealing seats and is used to switch over between the two outlets 103 and 104. The water diverting switch includes a fixed base 3 connected with the inlet 101 and outlet (103, 104) pipelines. The water diverting switch also has a sliding shaft 2 and there is a sliding through hole 31 of the sliding shaft 2 on the fixed base 3. A head 21 of the sliding shaft 2 is inserted into and extends beyond the sliding through hole 31. In this embodiment, a tail of the sliding shaft 2 is connected with a button 1 at tail threads of the sliding shaft 2. The switch has a spring 4 pushing the connection of the button 1 and the sliding shaft 2 along a direction from head 21 of the sliding shaft 2 towards its tail. The spring 4 is located between the fixed base 3 and the button 1. The sliding shaft head 21 is connected with a valve core 20, and the positions of the above-mentioned upper sealing seat 102 and lower sealing seat 105 correspond with the movement distance of the valve core 20.

As shown in the FIG. 1, the water outlet 104 is under the sealing seat 105. Item 23 in FIG. 1 is a sealing gasket mounted on the valve core 20. The spring 4 may be at any position where the sliding shaft 2 is able to obtain a force for moving from the head to the tail.

Item 106 in FIG. 1 is a seal ring mounted on the sliding shaft 2 between the sliding shaft and the fixed base 3. Item 107 in FIG. 1 is a seal ring mounted between the fixed base 3 and the faucet 100.

The water diverting switch is provided with a retaining hook 6 for the sliding shaft 2. The retaining hook 6 is connected on the fixed base 3. On an outer side of the fixed base 3 there is a ring spring 5 for fixing the retaining hook 6. The retaining hook 6 can also be connected on a part connected with the fixed base 3.

Figure 3:
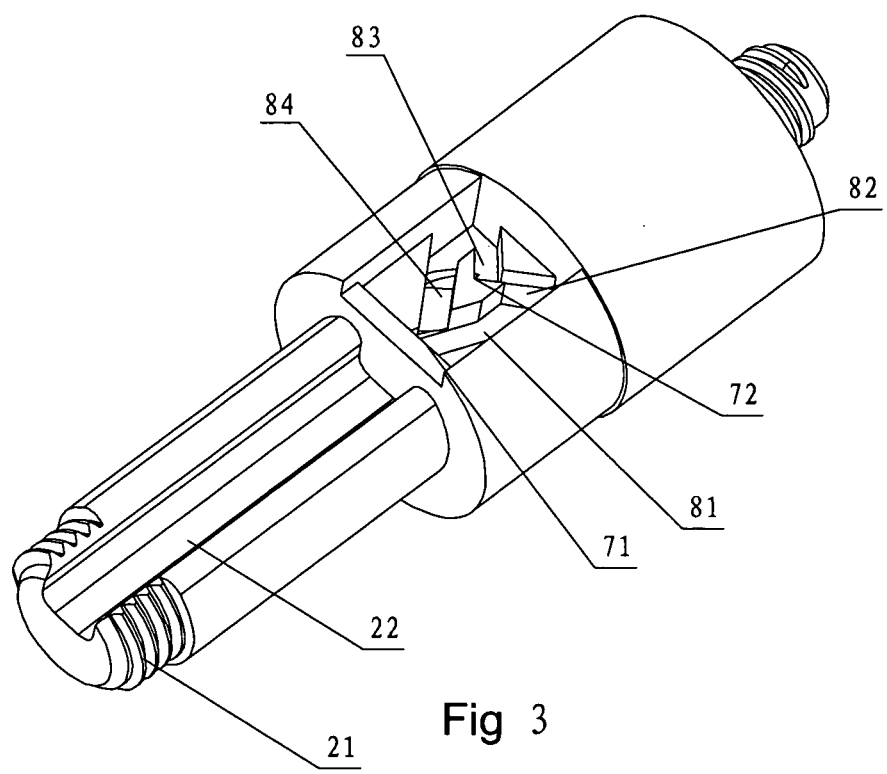
FIG. 3 is the diagram of a sliding shaft of the present invention.
Figure 4:
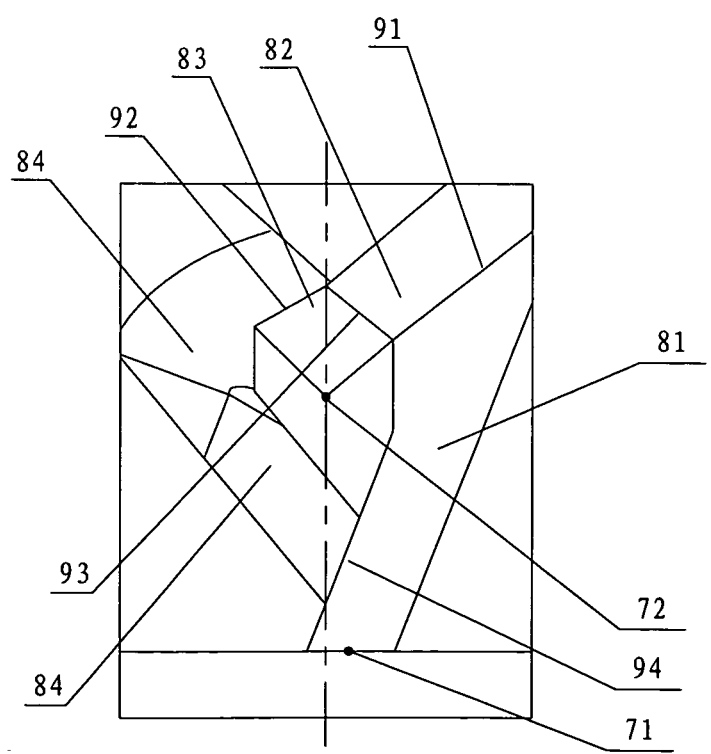
FIG. 4 is front view of the sliding shaft shown in FIG. 3 located in a unidirectional slide channel and stop position.

As can be seen in particular in FIG. 3, on the surface of the sliding shaft 2, there are a first stop position 71 and a second stop position 72 fitting with a hook part 60 of the retaining hook 6, and the first stop position 71 and second stop position 72 are located at different heights on the sliding shaft 2, with the first stop position 71 close to the head 21 of the sliding shaft 2. On the surface of the sliding shaft 2, there is a first unidirectional slide channel for the hook part of the retaining hook 6. The first unidirectional slide channel allows the sliding shaft 2 move from the state where the first stop position 71 is fitting with the hook part 60 of the retaining hook 6 to the state where the second stop position 72 is fitting with the hook part 60 of the retaining hook 6. On the surface of the said sliding shaft 2, there is a second unidirectional slide channel for the hook part 60 of the retaining hook 6. The second unidirectional slide channel allows the sliding shaft 2 move from the state where the second stop position 72 is fitting with the hook part 60 of the retaining hook 6 to the state where the first stop position 71 is fitting with the hook part 60 of the retaining hook 6. The first unidirectional slide channel consists of a first slide way section 81 starting at the first stop position 71 and a second slide-way 82 connected with the first slide way section 81 and leading to the second stop position 72, whereby the connection from the second slide-way 82 with the first slide-way section 81 is located farther away from the head 21 of the sliding shaft 2 than the second stop position 72. The second unidirectional slide channel consists of a third slide way section 83 starting at the second stop position 72 and a fourth slide way section 84 connected with the third slide way section 83, whereby the connection from the fourth slide-way section 84 with the third slide-way section 83 is located farther away from the head 21 of the sliding shaft 2 than the second stop position 72, and the fourth slide way section 84 is connected with the first slide way section 81 or connected to the first stop position 71.

Relative unidirectional slide movement between the first and the second unidirectional slide channels, and the hook part 60 can be provided through a slide channel design on a wall of the first and the second unidirectional slide channels, or a slide channel design on a bottom of the first and the second unidirectional slide channels. In this embodiment, such relative unidirectional slide movement is provided through the design of the slide channel on the bottom, so that the switch has higher operation reliability and longer service life. Its design scheme is as follows: the first slide way section 81 and second slide way section 82 are connected in the form of a step, and at a connection 91, a channel bottom of the second slide way section 82 is lower than that of the first slide way section 81. The third slide way section 83 and fourth slide way section 84 are connected in the form of a step, and at a connection 92, a channel bottom of the fourth slide way section 84 is lower than that of the third slide way section 83. The second slide way section 82 has a down step 93 near the second stop position 72. The fourth slide way section 84 and first slide way section 81 are connected in the form of a step, and at a connection 94, a channel bottom of the first slide way section 81 is lower than that of the fourth slide way section 84.

Figure 2:
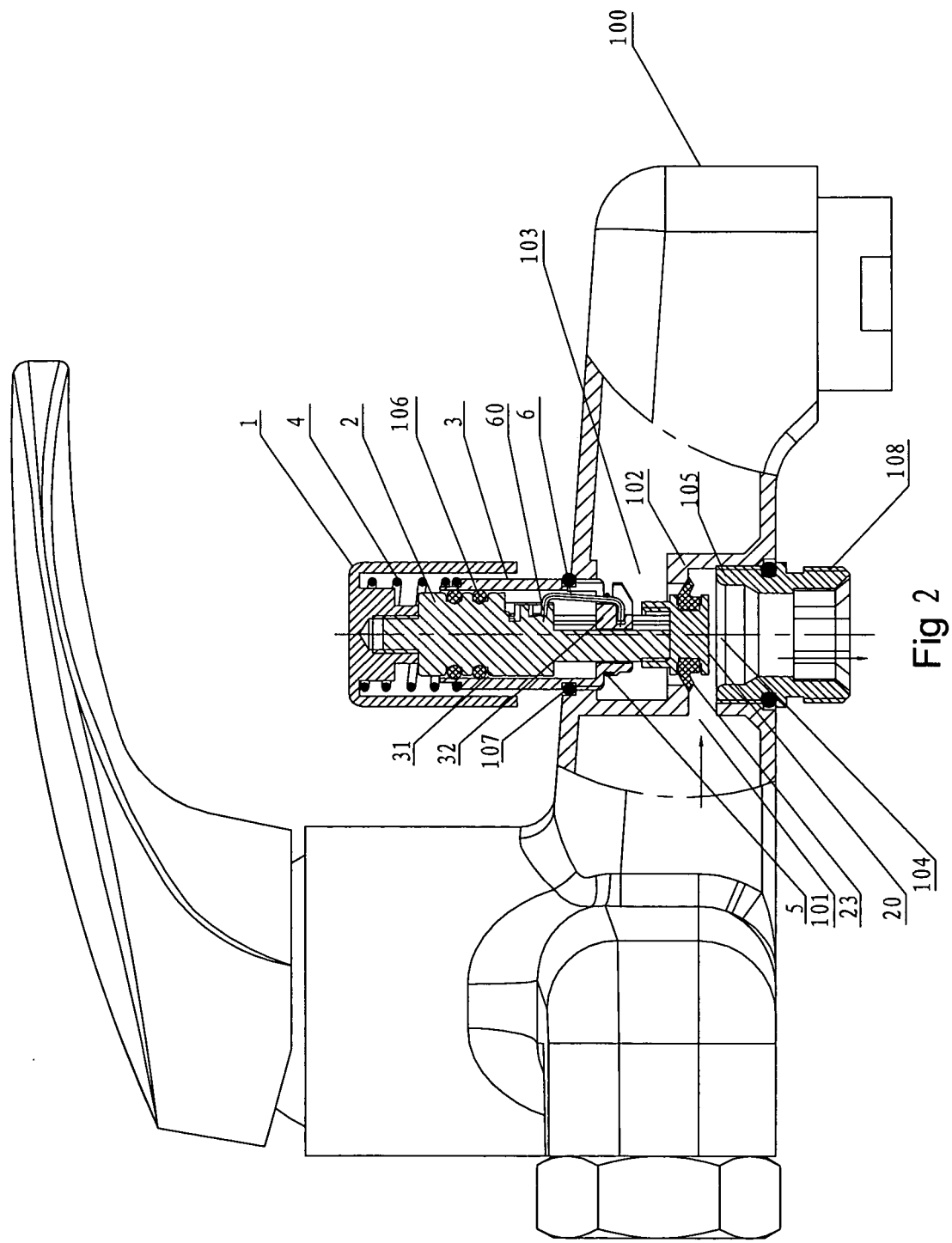
FIG. 2 is the sectional view of the embodiment shown in FIG. 1 when it is applied for the faucet and is in a lower water dispensing position.

This embodiment fits with the immovable slide way on sliding shaft 2 through swinging of the hook part 60 of the retaining hook 6. The sliding shaft 2 has a positioning sliding channel 22 (see FIG. 3) in the axial direction and the fixed base 3 has a protruding positioning block part 32 whose shape can be used to fit with the retaining hook 6, as shown in FIGS. 1 and 2. In addition, the retaining hook 6 is connected by hooking to the protruding positioning part 32 of the fixed base 3. A circumferential positioning mechanism can also be the positioning channel that is provided in other position on the fixed base 3, such as an inner hole. The protruding positioning part 32 of the fixed base 3 is positioned at another corresponding position on the sliding shaft 2. Furthermore, the circumferential positioning mechanism can also be any other common circumferential positioning mechanism between shaft and sleeve or provide corresponding positioning function by means of a device.

In other examples of embodiments (not shown in FIGS. 1-4), the sliding shaft 2 can also be used to rotate by a specified angle to provide a fit between the slide way and retaining hook 6, but it is not as convenient and comfortable in use as in the embodiment of FIGS. 1-4.

During the operation of the water diverting device, a pressure force is applied on the button 1, and the button 1 drives the sliding shaft 2 to move down towards the sealing seat 105. In this case, the hook end 60 of retaining hook 6 is positioned on the fixed base 3 by the ring spring 5. The hook part 60 of the retaining hook 6 moves up the first slide way section 81 from the first stop position 71. When the button 1 is depressed all the time, the hook part 60 of the retaining hook 6 moves into a second hook part at the connection 91. When the button 1 is released, the button 1 and the sliding shaft 2 move up under the action of spring 4, but as the first slide way section 81 and second slide way section 82 are connected in the form of a step, and at the connection 91, the channel bottom surface of the second slide way section 82 is lower than that of the first slide way section 81, the hook part 60 of the retaining hook 6 cannot move back on the original way and can only move to the second stop position 72 area on second slide way section 82 to connect with a vector point of the second stop position 72, which is a state position of the switch and provides downward travel of the sliding shaft. In this case, the spring 4 is compressed and sealing gasket 23 on the valve core 20 gets into contact with the lower sealing seat 105. The lower water outlet 104 is in sealing state, and the water diverting device is in upper water dispensing state, and water flows out of the outlet 103.

A user may depress the button again. Since the second slide way section 82 has a down step at the position near second stop position 72, and the hook part 60 of the retaining hook 6 cannot move back on the original way and can only move up along the third slide way section 83, the hook part 60 moves into the fourth slide way section 84. When the button 1 is released, the button 1 and the sliding shaft 2 move up under the action of spring 4. As the third slide way section 83 and fourth slide way section 84 are connected in the form of a step, and at the connection 92, the channel bottom surface of the fourth slide way section 84 is lower than that of the third slide way section 83, the hook part 60 of the retaining hook 6 cannot move back on the original way and can only move down to the first stop position 71 along the fourth slide way section 84 or move down into the first slide way section 81 along the fourth slide way section 84 and finally returns to the first stop position 71 and connect with the first stop position 71, which is another state position of the switch and finishes upward movement of the sliding shaft 2. In this case, sealing gasket 23 on the valve core 20 gets into contact with the sealing seat 102. The upper water outlet 103 is in sealing state, and the water diverting device is in lower water dispensing state and water flows out of the outlet 104.

Embodiment 2

Figure 5:
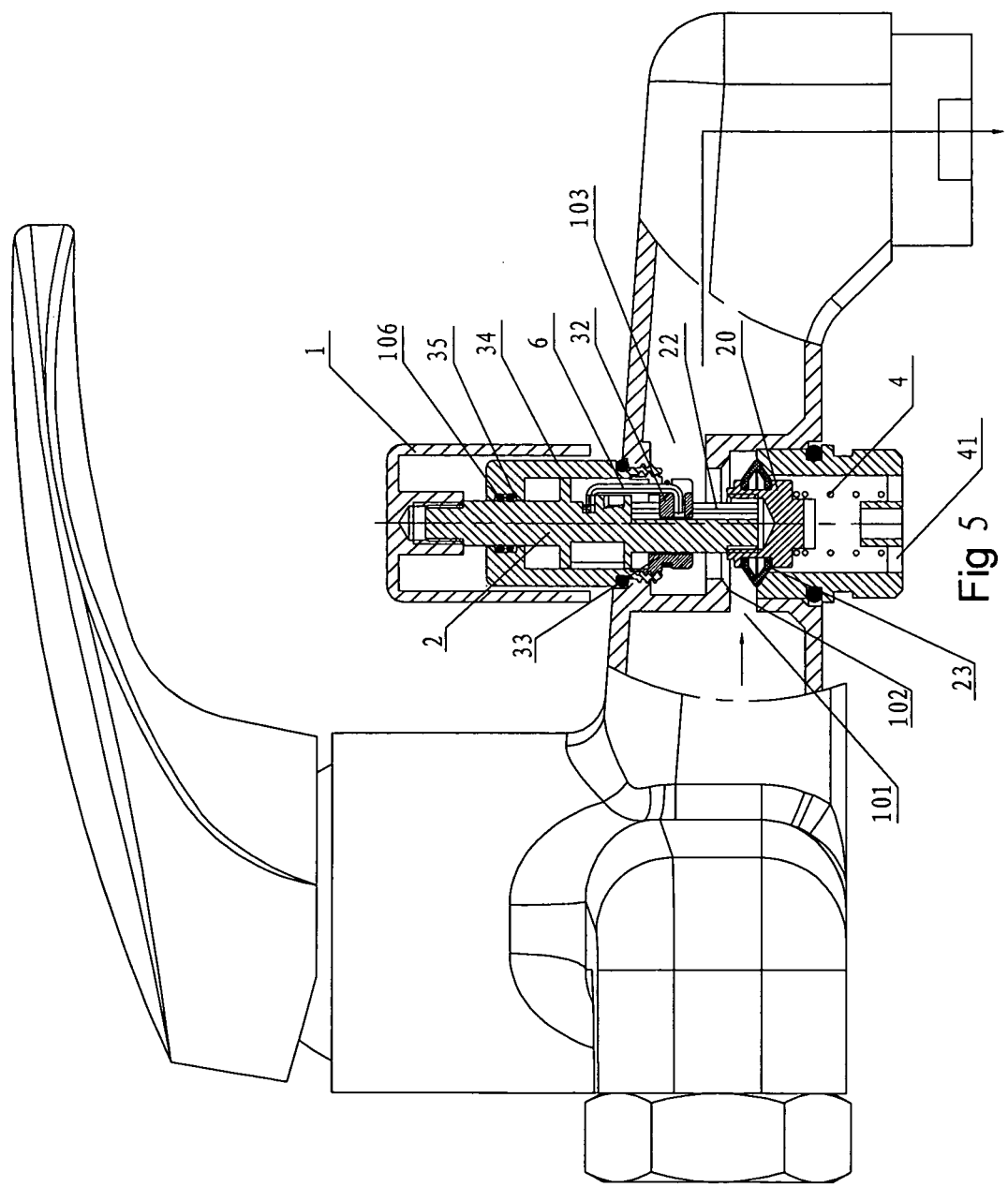
FIG. 5 is a sectional view of another embodiment of the present invention when it is applied for the faucet and is in an upper water dispensing position.

The fixed base 3 in Embodiment 1 can also be formed by some parts connected with each other. Referring to FIG. 5, in an embodiment shown therein, the fixed base includes a mounting piece 33 and a connection sleeve 34 connected with its rear part. The connection sleeve 34 is connected with the water inlet pipeline 102 and water outlet pipelines 103 and 104. The sliding shaft 2 is smaller near its tail or between its middle and tail and goes through the connection sleeve 34. The connection sleeve 34 has a small hole 35 that fits with the smaller part of the sliding shaft 2. The retaining hook 6 is connected to the mounting piece 33. A ring spring for fixing the retaining hook 6 is provided on an outer side of the mounting piece 33.

Hence, the seal ring 106 as known from Embodiment 1 can be mounted on the smaller part of the sliding shaft 2 in Embodiment 2, and is connected under sealing condition with the small hole 35 on the connection sleeve 34 in order to reduce sliding resistance.

In this embodiment 2, there is a supporting bracket 41 for the spring 4 on outer side of the sealing seat. The spring 4 is positioned between supporting bracket 41 and the valve core 20 connected on the head 21 of the sliding shaft 2, so as to reduce a structure height by using its internal space.

Other parts of this embodiment are the same as Embodiment 1. Same item numbers in FIG. 5 and FIG. 6 as in FIGS. 1~4 have the same meanings as in FIGS. 1~4.

Embodiment 3

With reference to FIG. 7 and FIG. 8, in this embodiment, the present invention is installed on the water diverter. The same water diverting device as in Embodiment 2 is used in this embodiment.

Figure 6:
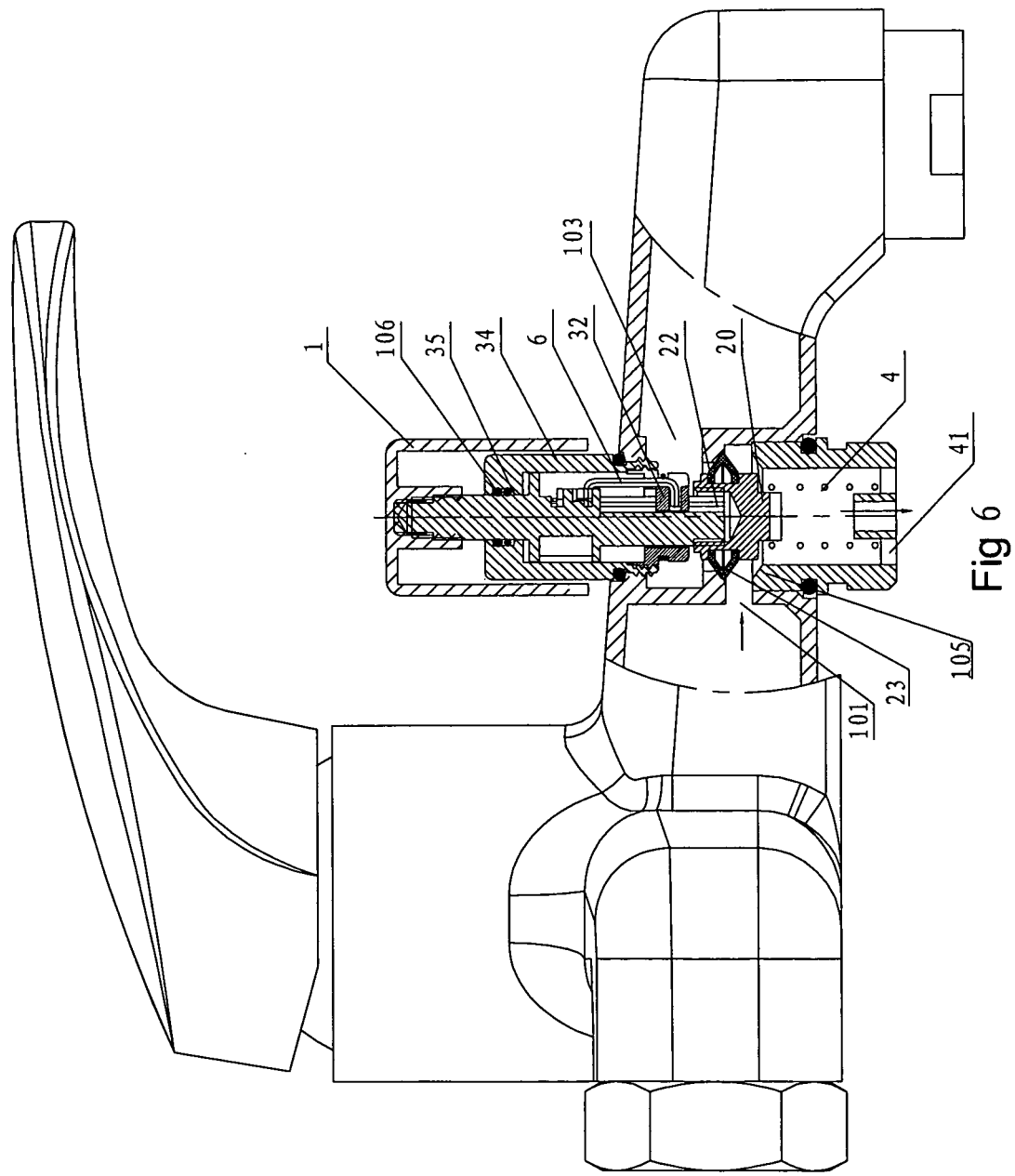
FIG. 6 is the sectional view of the embodiment shown in FIG. 5 when it is in a lower water dispensing position.

In FIG. 7 and FIG. 8, same item numbers in these figures as in FIG. 5 and FIG. 6 have the same meanings as in FIG. 5 and FIG. 6.

The invention claimed is:

1. A water diverting device comprising
a water inlet and two outlets,
an upper sealing seat and a lower sealing seat;
a water diverting switch that fits with the upper sealing seat and the lower sealing seat, whereby the water diverting switch is used to switch over between the two outlets;
the water diverting switch comprising
a sliding shaft and a fixed base, whereby the fixed base comprises a sliding through hole for passing the sliding shaft,
a retaining hook having a hook part,
whereby on the sliding shaft, there are a first stop position and a second stop position, each respectively shaped to fit with the hook part of the retaining hook, and the first stop position and the second stop position are each located at different heights on the sliding shaft, with the first stop position being closer to a head of the sliding shaft than the second stop position,
whereby on the sliding shaft, there is further
a first unidirectional slide channel for the hook part of the retaining hook, the first unidirectional slide channel allowing the sliding shaft move from a state where the first stop position is fitting with the hook part of the retaining hook to a state where the second stop position is fitting with the hook part of the retaining hook, and
a second unidirectional slide channel for the hook part of the retaining hook, the second unidirectional slide channel allowing the sliding shaft move from a state where the second stop position is fitting with the hook part of the retaining hook to a state where the first stop position is fitting with the hook part of the retaining hook,
the first unidirectional slide channel comprising a first slide way section starting at the first stop position and a second slide way section connected with the first slide way section and leading to the second stop position, the connection from the second slide way section with the first slide way section being located farther away from the head of the sliding shaft than the second stop position, the second unidirectional slide channel comprising a third slide way section starting at the second stop position and a fourth slide way section connected with the third slide way section, the connection from the fourth slide way section with the third slide way section being located farther away from the head of the sliding shaft than the second stop position, and the fourth slide way section is connected with the first slide way section or connected to the first stop position, the water diverting switch further comprising a first spring pushing the sliding shaft along a direction from the head of the sliding shaft towards a tail of the sliding shaft, the head of the sliding shaft being connected with a valve core, and the positions of the upper sealing seat and the lower sealing seat corresponding with a movement distance of the valve core;

wherein the head of the sliding shaft or an extension of the sliding shaft extending from the head of the sliding shaft extends out of the sliding through hole in the fixed base for connection with the valve core;

wherein the retaining hook is connected by hooking to the fixed base, and an O-shaped ring spring surrounds an outer surface of the fixed base and the retaining hook for fixing the retaining hook to the fixed base;

wherein the tail of the sliding shaft is connected with a button;

wherein the first slide way section and the second slide way section are connected in the form of a step, and at the connection between the first slide way section and the second slide way section, a channel bottom surface of the second slide way section is lower than a channel bottom surface of the first slide way section; the third slide way section and fourth slide way section are connected in the form of a step, and at the connection between the third slide way section and the fourth slide way section, a channel bottom surface of the fourth slide way section is lower than a channel bottom surface of the third slide way section; the second slide way section has a down step near the second stop position; the fourth slide way section and the first slide way section are connected in the form of a step, and at the connection between the fourth slide way section and the first slide way section, the channel bottom surface of the first slide way section is lower than the channel bottom of the fourth slide way section;

wherein a circumferential positioning mechanism for the sliding shaft;

wherein the circumferential positioning mechanism comprises a positioning slot in an axial direction provided on the sliding shaft and a positioning block provided on the fixed base, whereby the positioning block is fitted with the positioning slot; and wherein the retaining hook is connected by hooking to the positioning block on the fixed base.

2. The water diverting device according to claim 1,
wherein the fixed base includes a mounting piece and a connection sleeve, connected with the rear part of the mounting piece; the sliding shaft is smaller near its tail or between its middle and tail and goes through the connection sleeve; the connection sleeve having a small hole that fits with the smaller part of the sliding shaft.

3. The water diverting device according to claim 2,
wherein the retaining hook is connected by hooking to the mounting piece.

4. The water diverting device according to claim 1,
wherein the first spring is located between the fixed base and the button, and directly engages both the fixed base and the button.

5. The water diverting device according to claim 1,
wherein there is a spring bracket on an external side of the lower sealing seat and the first spring is between the spring bracket and valve core.

6. The water diverting device according to claim 1,
wherein the fixed base includes a mounting piece and a connection sleeve connected with a rear part of the mounting piece, the sliding shaft being smaller near its tail or between its middle and tail, and the sliding shaft goes through the connection sleeve, the connection sleeve comprising a small hole that fits with the smaller part of the sliding shaft; and wherein a sealing device is mounted on the smaller part of the sliding shaft and is located within the small hole in the connection sleeve.

* * * * *